Patented Dec. 12, 1950

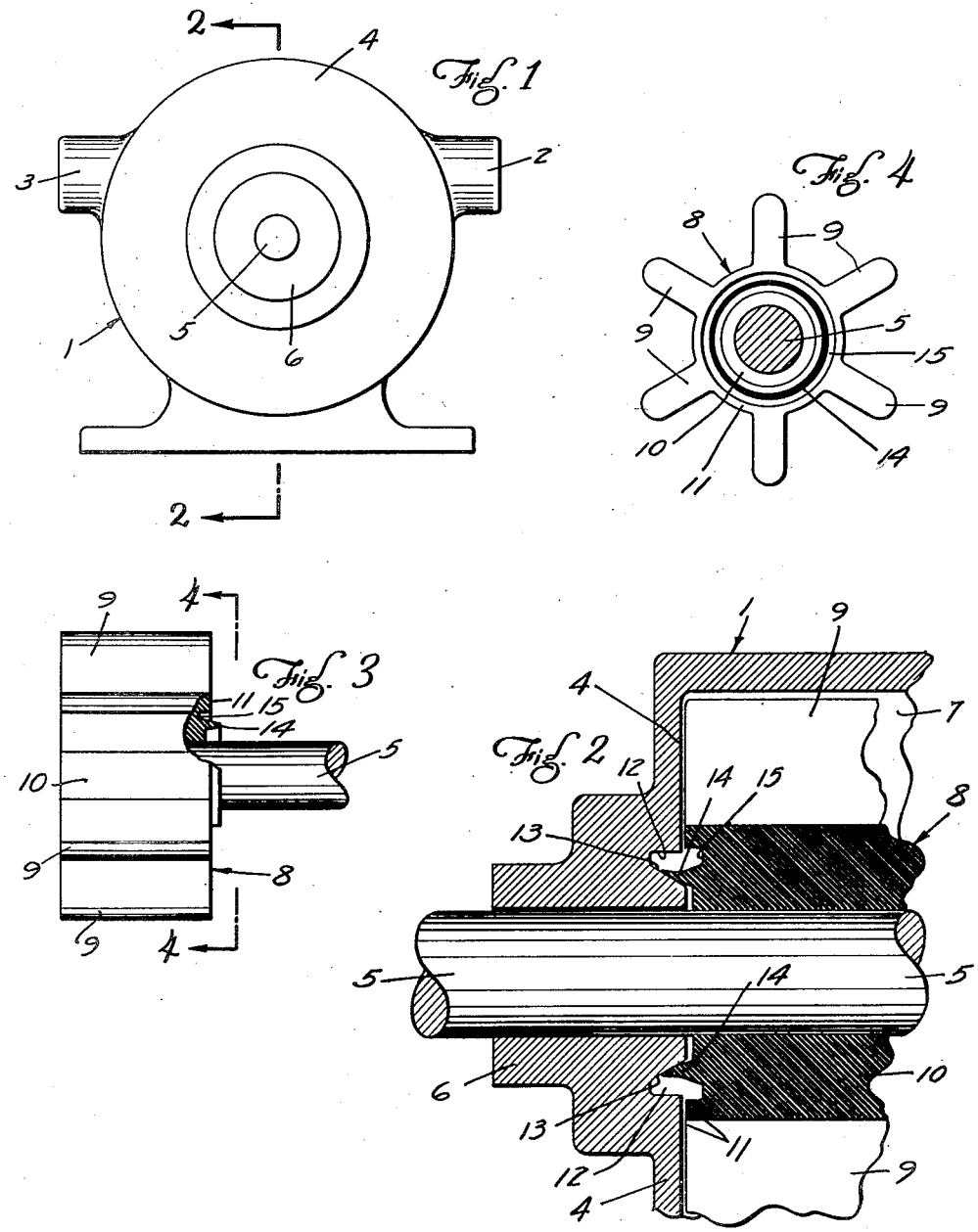

2,533,399

UNITED STATES PATENT OFFICE 2,533,399

FLUID PRESSURE SEAL FOR ROTARY PUMPS AND THE LIKE

Harry J. Sadler and Ernest E. Cook, Minneapolis, Minn., assignors to Hypro Engineering Co., Minneapolis, Minn., a corporation of Minnesota Application December 5, 1947, Serial No. 789,912

3 Claims. (Cl. 103—111)

Our invention relates to fluid pressure seals for rotary pumps and the like and has for its object the provision of a combination pump impeller and fluid seal, which is highly efficient, inexpensive to manufacture, and durable in use.

Generally stated, the invention consists of novel devices, combinations of devices, and arrangement of parts hereinafter described and defined in the claims.

Referring to the attached drawings wherein like characters indicate like parts throughout the several views:

Fig. 1 is a side elevation of a pump incorporating our novel invention;

Fig. 2 is an enlarged fragmentary section taken substantially on the line 2—2 of Fig. 1;

Fig. 3 is a fragmentary view in side elevation of our novel pump impeller, some parts being broken away; and Fig. 4 is a view partly in section and partly in end elevation, taken substantially on the line 4—4 of Fig. 3.

Referring with greater particularity to the drawings, the numeral 1 indicates, in its entirety, a pump housing having inlet and outlet connections 2 and 3, respectively, and an end wall 4. A rotary shaft 5 is journalled in a bearing boss 6 on the end wall 4 and extends into a substantially cylindrical pump chamber 7 formed by the housing 1. A pump impeller 8, preferably made from synthetic rubber or other resilient material, is secured fast to the shaft 5 and is carried thereby within the chamber 7. The impeller 8 is provided with a plurality of impeller blades or vanes 9 which extend radially outwardly from an annular hub portion 10. One end wall 11 of the hub 10 lies closely adjacent the end wall 4 of the pump housing 1.

The interior of the housing wall 4 is provided with an annular groove 12 adjacent the end wall portion 11 of the impeller 8. As shown, the groove 12 is concentric with the rotary shaft 5 and is provided with a sealing face 13 which tapers radially inwardly toward the impeller 8. Integrally formed with the hub 10 of the impeller 8 is a resilient axially projecting annular sealing flange 14. The flange 14, in cross-section, tapers to a feather edge at its projected end. The outer peripheral wall of the flange 14 extends axially into the hub 10 and forms one side wall of an annular groove 15, the primary purpose of which groove is to impart greater flexibility to the sealing flange 14.

As shown, the normal diameter of the sealing flange 14, and particularly the projected end thereof, is less than the maximum diameter of the sealing face 13, but is greater than the minimum diameter thereof. It will also be observed that when the opposed walls 4 and 11 are brought into close proximity to each other, in assembling the pump, the sealing flange 14 is of such axial length that its free end will be stretched over the tapered sealing face 13 as it rides upwardly thereon. Pressure of the fluid within the chamber adds to the frictional engagement of the resilient flange with the tapered face 13.

From the above it should be obvious that the seal made between the stretched flange 14 and the tapered face 13 is sufficient to prevent fluid from leaking therebetween and outwardly through the bearing boss 6. Furthermore, the sealing efficiency of such a seal is not impaired until the flange 14 is so worn down that it is no longer stretched or expanded.

Our invention has been thoroughly tested and found to be entirely adequate for the accomplishment of the ends sought, and while I have shown a preferred embodiment of my invention, it will be understood that the same is capable of modification without departure from the spirit and scope of the invention as expressed in the following claims.

What we claim is:

1. In a device of the class described, a stationary element and a rotary element, one of said elements being journalled in the other thereof, said elements having opposed closely adjacent end walls, an annular groove in one of said walls concentric with said rotary element and having a sealing face which tapers inwardly in the direction of the opposed end wall, an annular elastic sealing flange projecting axially outwardly from the other of said end walls and adapted to frictionally engage said tapered sealing face, said flange terminating in an extended free end of less thickness than the base thereof, the diameter of the extended end of said flange being greater than the minimum diameter of said tapered face but less than the maximum diameter thereof, whereby the free end of said elastic flange will be radially stretched when forced into engagement with said tapered face.

2. In a device of the class described, a stationary element and a rotary element, one of said elements being journalled in the other thereof, said elements having opposed closely adjacent end walls, an annular groove in one of said walls concentric with said rotary element and having a sealing face which tapers inwardly in the direction of the opposed end wall, an annular elastic sealing flange projecting axially outwardly from the other of said end walls and adapted to frictionally engage said tapered sealing face, the diameter of the extended end of said flange being greater than the minimum diameter of said tapered face but less than the maximum diameter thereof, whereby the free end of said elastic flange will be stretched when forced into engagement with said tapered face.

3. In a pump structure, a housing defining a pump chamber having an inlet and an outlet, a rotary shaft extending through said chamber and journalled in the end walls of said housing, a rubber-like fluid impeller fast on said shaft within said chamber, opposed annular grooves in the end walls of said housing concentric with said shaft, said grooves having sealing faces which taper radially inwardly toward said impeller, and integrally formed annular elastic sealing flanges on opposite sides of said impeller, said flanges projecting axially outwardly from said impeller and one each thereof engaging one of said sealing faces with sufficient force to cause the free ends thereof to be circumferentially stretched.

HARRY J. SADLER.
ERNEST E. COOK.

REFERENCES CITED

The following references are of record in the file of this patent:

UNITED STATES PATENTS

| Number | Name | Date |
|---|---|---|
| 2,021,346 | Allen | Nov. 19, 1935 |
| 2,144,691 | Schmal | Jan. 24, 1939 |
| 2,171,968 | Augustin | Sept. 5, 1939 |
| 2,367,882 | McKnight | Jan. 23, 1945 |
| 2,373,443 | Armington | Apr. 10, 1945 |
| 2,403,796 | Hanna | July 9, 1946 |

FOREIGN PATENTS

| Number | Country | Date |
|---|---|---|
| 289,365 | Great Britain | Apr. 26, 1928 |
| 464,475 | France | Apr. 16, 1937 |